United States Patent Office 3,344,216
Patented Sept. 26, 1967

3,344,216
PROCESS OF CASTING AMYLOSE FILMS
Thomas F. Protzman, Decatur, John A. Wagoner, Mount Zion, and Austin H. Young, Decatur, Ill., assignors to A. E. Staley Manufacturing Company, Decatur, Ill., a corporation of Delaware
No Drawing. Filed Jan. 6, 1964, Ser. No. 336,059
21 Claims. (Cl. 264—93)

This application relates to a new method of casting amylose films from an aqueous solution.

Chemical literature is replete with references describing various techniques of casting amylose films from an aqueous solution. U.S. Patent 2,656,571 to Davis et al. discloses dissolving amylose in a composition comprising water and an amylose complexing agent. The patentees indicate that best results are obtained if the film is formed, as for example, cast, on a heated surface and kept at a temperature sufficient to prevent the amylose solution from gelling until the amount of solvent in the film has been reduced to a minimum. U.S. Patent 2,608,723 to Wolff et al. discloses an improvement on the Davis et al. technique. The patentees indicate that the complexing agents as used by Davis et al. can be removed from the casting solution as by azeotropic distillation before the solution is cast or the films are otherwise formed. In this way, Wolff et al. found that they did not have to maintain the cast films at elevated temperatures above the temperature of gelation, in order to produce films having the desired strength, transparency, and uniformity. Wolff et al. indicate that if films made according to the prior process are permitted to cool to the point of gelation before substantially dry, the films were hazy and tended to crack. It goes without saying that it is desirable from an economc point of view to avoid the use of the complexing agents disclosed by Wolff et al. and Davis et al.

U.S. Patent 2,822,581 to Muetgeert et al. discloses that amylose films can be formed by dissolving amylose in water at a temperature of at least 120° C., preferably 140 to 165° C., cooling the solution to a temperature below the boiling pint at ordinary atmospheric pressure, and casting a film from the clear solution onto a support having a temperature higher than the gelation temperature of the solution, after which the film is dried and cooled. Various other reference works are cumulative in their disclosures to the above described patents. Included among these cumulative references are U.S. Patent 2,798,990 to Davis; German Patent 1,063,325; German Patent 1,003,437; an article in the Industrial and Engineering Chemistry, volume 43, No. 4, at page 915, etc.

Some serious drawbacks to the commercial use of amylose films are discussed in a Cereal Science Today article entitled "Potential Industrial Use of Amylose," volume 3, No. 8, October 1958, pages 206–209. The article states that unplasticized amylose films are brittle and have poor elongation and that, within certain limitations, amylose can be plasticized with humectants, such as glycerol, which are solvents or swelling agents for amylose. However, humectants increase the water solubility of the film, lower film strength and vary in efficiency under varying climatic conditions. Further, their plasticizing effect is not permanent. We have found, for example, that after aging about two months at 50% relative humidity or a week at 23% relative humidity, glycerol plasticized amylose films, prepared by prior art techniques, have about the same relatively poor elongation and brittleness as unplasticized amylose film otherwise made in the same way. The article indicates that there is need for a plasticizer that will permanently plasticize amylose films and/or does not adversely affect the strength and water-solubility or water-sensitivity of amylose films.

Films cast from amylose solutions are water-insoluble. The films will, however, absorb water with resulting loss in strength. Since wet strength is often a requirement, a method of preparing water-resistant, flexible films is important.

The general object of this invention is to provide a new and improved method of preparing amylose films. A principal object of this invention is to provide a process of preparing amylose films where the plasticizing effect of conventional plasticizers, particularly glycerol, has less of a tendency to disappear as the amylose film ages. Another object of this invention is to provide a process of preparing amylose films where the plasticizing effect of polyhydric alcohol humectants, particularly glycerol, is relatively independent of humidity. Still another object of this invention is to provide a process of preparing amylose films, which tends to minimize the water-sensitivity of amylose films. A further object of this invention is to prepare amylose films without using organic complexing agents. Other objects appear hereinafter.

We have now found that the elongation, flexibility and water-sensitivity of amylose films as well as the effectiveness of amylose plasticizers are dependent upon the process of forming the film. The method of preparing amylose films determines the crystallinity and extent of hydrogen bonding of the amylose. As the crystallinity of an amylose film increases, the film becomes progressively less flexible and also loses its extensibility. As indicated above, typical amylose plasticizers, which are solvents or swelling agents for amylose, such as glycerol, do temporarily improve the flexibility and percent elongation of amylose films. However, the solvent or swelling properties of these plasticizers facilitate the movement of amorphous molecular chain segments of amylose molecules toward amylose crystalline areas and this accelerates crystallization within the film. In many cases, we have found that on aging, unplasticized amylose films are more flexible and more extensible than plasticized amylose films. Accordingly, the successful utilization of these plasticizers is dependent upon the availability of a casting process which permits the preparation of amylose films having a controlled degree of crystallinity.

When an amylose film is prepared by the method described in U.S. Patent 2,822,581 to Muetgeert et al. (i.e. casting an aqueous solution of amylose onto a support having a higher temperature than the gelation temperature of the amylose solution, followed by drying at above the gelation temperature of the amylose solution) the amylose film has less of a tendency to swell on exposure to water and appears to be denser that amylose films prepared by casting on a support at room temperature, followed by drying under ambient conditions. We believe that both of these properties are due to the fact that the amylose film prepared by the method of Muetgeert et al. has initially a much lower degree of hydrogen bonding than the amylose film prepared by casting on a support at room temperature, followed by drying under ambient conditions. This initial low degree of hydrogen bonding results in the amylose film having a less open structure. While a denser, more water-resistant amylose film is desirable, films prepared by the method of Muetgeert et al. tend to be quite susceptible to embrittlement on aging, particularly in the presence of a polyhydric alcohol humectant. We believe that this tendency toward embrittlement is due to a combination of a relatively low initial degree of hydrogen bonding in the amylose film, which results in a less open structure, and to ready accessibility of the crystalline areas in the amylose to amorphous amylose molecules. On aging, the crystalline areas enlarge as the molecular chain segments in amorphous areas come in contact with the growing crystalline areas. This crystallization within the amylose film is accelerated by polyhydric alcohol plasticizers, as indicated above, and by moisture such as that available at 50% humidity at room temperature.

In large measure, the final crystallinity of an amylose film is dependent upon the completeness of dissolution of amylose in water and the extent of hydrogen bonding in the amylose film. We have found that amylose films having excellent properties can be produced by (1) dissolving amylose in water at a temperature of at least 130° C., (2) casting said aqueous solution of amylose onto a support having a temperature at least 10° C. less than the gelation temperature of the amylose solution and (3) as soon as said amylose forms a dimensionably stable form (gel), drying said amylose at a temperature above the gelation temperature of the amylose solution.

While we do not wish to be bound by any theory, we believe that the recited process operates in the following manner. Dissolution in water at a sufficiently high temperature reduces the concentration of amylose crystallite seed nuclei in the final amylose film, and thereby reduces the concentration of sites where crystallization of amylose molecules in the film can be initiated. Casting the amylose solution on a support maintained at a sufficiently low temperature, apparently enmeshes essentially all the crystallite seed nuclei in the hydrogen bonded network in a manner which makes the amylose crystallite seed nuclei inaccessible to the more amorphous chain segments of the amylose molecules. Rapid drying of the gel inhibits both crystallization around the crystallite seed nuclei, which takes place when the amylose gel is permitted to dry slowly at room temperature, and additional hydrogen bonding beyond that necessary to make the crystallite seed nuclei inaccessible to amorphous molecular chain segments of the amylose molecules. The rapid drying also results in the amylose films being denser and more water-resistant than amylose films cast and dried at room temperature. In fact, density and water-resistance are about the same as in films prepared by the method Muetgeert et al.

For the purpose of this invention, the term "amylose" refers to the amylose resulting from the separation of the amylose and amylopectin components of starch, or the whole starch which is composed of at least 50% amylose. Commercially available sources of amylose include "Nepol" amylose (the amylose fraction of corn starch), "Superlose" (the amylose fraction of potato starch), "Amylomaize" or "Amylon" (high-amylose corn starch containing about 54% amylose), "Amylon VII" (high-amylose corn starch containing up to 70% amylose), etc. The amylose coatings based on high-amylose corn starch can be simulated by mixing corresponding concentrations of separated corn amylose with separated amylopectin. Preferably, the amylopectin content of the amylose material (starch carbohydrate) is less than 20% by weight since the higher the concentration of amylose the better the flexibility and strength of the amylose. Wherever possible, defatted amylose should be used since small amounts of fat (1–2% fat based on the weight of the amylose) tend to detract from the clarity of the amylose and also cut down the effectiveness of amylose plasticizers. Suitable methods of defatting amylose are disclosed and claimed in commonly assigned applications Serial Nos. 314,884 and 291,255, filed respectively in the names of Macarus et al. and Schnell et al., now U.S. Patents 3,313,654 and 3,255,042.

As indicated above, the concentration of amylose crystallite seed nuclei is advantageously reduced by dissolving amylose in water at a temperature of at least 130° C. However, best films have been prepared by dissolving the amylose and essentially all the amylose crystallite seed nuclei in water prior to the casting step. When amylose and essentially all the amylose crystallite seed nuclei in said amylose are completely dissolved in water, a 10% by weight solution of said amylose forms a discontinuous noncohesive layer on a lecithin coated support maintained at about 96° C. The term "discontinuous noncohesive layer" is used in a descriptive manner to indicate that the amylose solution runs off the sides of a lecithin coated support and the amylose remaining on the support dries in a pattern resembling Swiss cheese. The more thoroughly the amylose is dissolved the smaller the tendency of the amylose to gel when cast and accordingly, the more important the temperature of support upon which the amylose is cast and the concentration of the amylose in the casting solution, as explained below.

In large measure, the crystallinity of the starting amylose controls the conditions necessary to dissolve essentially all the crystallite seed nuclei in the starting amylose. For example, highly retrograded crystalline corn amylose sold under the name "Nepol" amylose is not dissolved completely when a 10% slurry of said amylose is maintained at 150° C. for two minutes. Generally, 1 to 2 minutes at 155° C. to 160° C. assures the most desirable dissolution. On the other hand, a more amorphous amylose of the type sold under the name "Superlose" is dissolved completely by heating at 150° C. for 1 to 2 minutes. A completely amorphous amylose of the type disclosed in U.S. Patent 3,086,890 can be dissolved at still lower temperature. Regardless of the crystallinity, it is important for best results that the dissolution of amylose in water be sufficiently complete that a 10% solution of said amylose (a weight ratio of amylose to water of 1:10) forms a discontinuous noncohesive layer on a support maintained at 96° C. In this way, one can be sure that essentially all the crystallite seed nuclei have been dissolved.

In general, an aqueous slurry of about 4% to 20% by weight amylose (a weight ratio of amylose to water being from 1:24 to 1:4) is prepared. Below about 4% by weight amylose it is difficult to form a continuous self-supporting amylose film. This is due in part to the reduced tendency of the completely solubilized amylose to gel and in part to problems in forming a continuous film of sufficient thickness. Above about 20% by weight amylose the slurry is too viscous for proper handling. In addition, solutions formed at high amylose concentration are difficult to handle because of the greatly increased tendency of the solution to gel prematurely. Best results have been obtained using aqueous suspension of from about 7 to 14% by weight amylose (a weight ratio of amylose to water being from 7:93 to 7:43).

The amylose suspension is preferably dissolved by heating the aqueous slurry under pressure at about 140° C. to 170° C. in a continuous heat exchanger. While the temperature and holding time should be regulated in order to prevent undue degradation of the amylose, the operating conditions are desirably sufficient to dissolve essentially all the amylose crystallite seed nuclei (i.e. a 10% by weight aqueous solution of said amylose forms a discontinuous noncohesive layer on a support maintained at about 96° C.). Below about 140° C. it is difficult to dissolve a suitable concentration of amylose seed nuclei of a retrograded amylose. On the other hand, degradation becomes a problem above about 170° C. In general, degradation of amylose is not a serious problem when the amylose is maintained at 140° C. for up to ten to twenty minutes or at 170° C. for up to one to two minutes.

The amylose solution is then cast either batch-wise on a fixed flat surface or, preferably, continuously upon a revolving drum or a moving belt. Preferably, the support, which has been coated with a release agent such as lecithin, polydimethyl siloxane, talc, etc., is maintained at about room temperature or below (i.e. about 0° C. to 40° C.) in order to render the amylose dimensionally stable as rapidly as possible. As indicated above, the more complete the solution the more advisable it is to use a lower support temperature. However, the support can be maintained at higher temperatures so long as the support is at least 10° C. less than the gelation temperature of the amylose casting solution. For example, a 10% aqueous solution of crystalline retrograded corn amylose, which has been dissolved at 160° C. and will gel when stored for about three hours at 70° C., should be cast on a support having a maximum temperature of 60° C. But as indicated above, it is preferable to cast the amylose solution on a surface maintained at about room temperature or below in order to render the amylose dimensionally stable (i.e. gel) as rapidly as possible.

After the amylose has gelled, it is dried rapidly under restraint at a temperature above the gelation temperature of the amylose casting solution. Preferably, the amylose is dried at about 75° C. to 120° C. in an atmosphere in which a substantial relative humidity is maintained. Excellent results have also been obtained by merely heating the surface upon which the amylose is supported to about 75° C. to 120° C. When dry heat is employed in this manner, it is essential that the drying be complete in less than about eight minutes in order to avoid embrittlement of the film by overdrying, but this, of course, will vary slightly with water content, film thickness, moisture content of the environmental air and the like.

In most cases, the support upon which the amylose is cast serves as a sufficient restraint to prevent the amylose from shrinking, i.e. the amylose gel adheres sufficiently to the support to resist changes in dimension during drying. If desired, the amylose gel can be removed from the support and the edges of the gel placed under restraint while the remainder of the gel is supported by a gas (for example, the edges of the gel can be placed on a hoop). Expansion of air confined within the hoop will tend to orientate the film. This same type of partial orientation can also be obtained by casting the amylose solution on a 3-part belt composed of a center portion and two peripheral edges. After the amylose gels the central portion of the belt separates from the gel, which is still supported by the two peripheral edges, before the supported gel passes into the drying chamber. Hot air serves to place the film under tension and orient it.

As indicated, the described process is particularly useful for preparing plasticized amylose films wherein the plasticizing effect of amylose plasticizer is beneficial and not detrimental to the overall properties of amylose films, particularly on aging. Suitable amylose plasticizers include polyhydric alcohols such as glycerol, sorbital, 1,1,1-trimethylol propane, 1,2-propylene glycol, 1,2,6-hexanetriol, diglycerol, etc.; amino-alcohols such as triethanol amine, diethanol amine, ethanol amine, N-methyl diethanol amine, N-cyanoethyl diethanol amine, etc.; hydroxyalkyl amides such as N,N-di(hydroxyethyl) formamide, N,N-di(hydroxyethyl) acetamide, N,N-di(hydroxyethyl) lactamide, N-(hydroxyethyl) lactamide, N,N-di(hydroxyethyl) methane sulfonamide, N-(hydroxyethyl)-N,N',N', N'',N''-pentamethyl phosphoramide etc.; quaternary ammonium compounds such as choline chloride, tetraethyl ammonium chloride, etc. A number of other suitable plasticizers are also disclosed in commonly assigned applications, Serial Nos. 288,897, 323,570 and 325,145, now U.S. Patents 3,314,810, 3,318,715 and 3,320,081. One or more of these plasticizers can be used in a weight ratio of amylose plasticizer to amylose (dry solids basis) of about 5:95 to 60:40. Under most conditions, the plasticizer or plasticizers are used in a concentration of from 10 to 40 parts by weight with correspondingly 90 to 60 parts by weight amylose.

As indicated in commonly assigned application Serial No. 288,869, now U.S. Patent 3,312,641, polyvinyl alcohol is an extremely useful polymeric plasticizer for amylose. Polyvinyl alcohol can be used alone or together with one or more of the above described plasticizers.

The plasticizer can be added to the aqueous suspension of amylose prior to the dissolution of the amylose or added to the subsequently formed amylose solution. In either case, the plasticizer can be added as an aqueous solution or without water.

The following examples are merely illustrative and are not to be construed as limiting the scope of our invention. All of the data in the examples is an average of five determinations.

*Example I*

This example illustrates the preparation of glycerol plasticized amylose films by prior art techniques. An aqueous solution of corn amylose was prepared by pumping an aqueous slurry of 7.2 parts by weight undefatted corn amylose (d.s.b.) and 0.8 part by weight of undefatted corn amylopectin (d.s.b.) and 2 parts by weight of glycerol in 72 parts by weight water through a 35 foot long, .120" I.D. (inside diameter) coil of tubing heated to 150° C. and having a dwell time of 2 minutes. The aqueous solution was cooled to 95° C. and collected in a preheated Dewar flask. The solution was cast on a lecithin-coated glass plate at 30° C. using a doctor blade preheated to 95° C. The amylose film was maintained at 30° C. until dry. The same technique was employed for casting amylose films (a) on a glass plate maintained at 50° C., followed by drying the film at 50° C.; (b) on a glass plate maintained at 70° C., followed by drying the film at 70° C., and (c) on a glass plate maintained at 90° C., followed by drying the film at 90° C. Each film was stripped from the glass plate and stored at from 23–25° C. and 50% relative humidity. The percent elongation, tensile strength and elastic modulus of the films were determined after 1, 2, 4 and 16 weeks. The results are set forth below in Table I.

TABLE I

| Glass Plate Drying Temperature, °C. | Age of Film in Weeks | Film Thickness in Mils | Elastic Modulus in p.s.i. | Tensile Strength in p.s.i. | Percent Elongation |
|---|---|---|---|---|---|
| 30 | 1 | 2.0 | 143,000 | 2,200 | 21 |
| 50 | 1 | 1.8 | 153,000 | 2,820 | 22 |
| 70 | 1 | 1.3 | 157,000 | 3,100 | 19 |
| 90 | 1 | 2.6 | 118,000 | 2,330 | 23 |
| 30 | 2 | 2.0 | 145,000 | 2,340 | 27 |
| 50 | 2 | 1.6 | 236,000 | 3,240 | 12 |
| 70 | 2 | 2.1 | 278,000 | 3,650 | 9 |
| 90 | 2 | 1.3 | 334,000 | 4,670 | 7 |
| 30 | 4 | 2.0 | 231,000 | 3,400 | 10 |
| 50 | 4 | 1.9 | 260,000 | 4,030 | 10 |
| 70 | 4 | 1.6 | 266,000 | 4,020 | 9 |
| 90 | 4 | 1.6 | 284,000 | 4,620 | 5 |
| 30 | 16 | 2.0 | 305,000 | 5,180 | 6 |
| 50 | 16 | 2.4 | 276,000 | 4,820 | 7 |
| 70 | 16 | 1.7 | 360,000 | 5,780 | 4 |
| 90 | 16 | 1.5 | 341,000 | 6,470 | 4 |

The above data clearly show that glycerol plasticized, amylose films prepared by prior art techniques lose their extensibility on aging.

*Example II*

This example illustrates that glycerol plasticized amylose films prepared by the method of this invention retain their extensibility on aging. An aqueous solution of defatted corn amylose was prepared by pumping an aqueous slurry of 11.4 parts by weight corn amylose (d.s.b.) and .6 part by weight corn amylopectin (d.s.b.) and 3 parts by weight of glycerol in 88 parts by weight water through a 35-foot long, 0.120" I.D. coil of tubing heated to 160° C. and having a dwell time of 2 minutes. The aqueous solution was cooled to 95° C. and collected in a preheated Dewar flask (95° C.). The solution was cast on a lecithin coated plate at room temperature (25° C.) using a doctor blade preheated to 90° C. As soon as the amylose gelled, the gel was dried at 96° C. for six minutes. The films were stripped from the glass plate and stored at 23° C. and 50% relative humidity. The percent elongation, tensile strength and elastic modulus were determined after 1, 4, 8 and 16 weeks. The results are set forth below in Table II.

TABLE II

| Age of Film in Weeks | Film Thickness in Mils | Elastic Modulus in p.s.i. | Tensile Strength in p.s.i. | Percent Elongation |
|---|---|---|---|---|
| 1 | 1.65 | 322,000 | 5,520 | 12 |
| 4 | 2.06 | 302,000 | 4,850 | 15 |
| 8 | 1.82 | 341,000 | 5,820 | 9 |
| 16 | 1.84 | 355,000 | 5,720 | 9 |

The above data shows that glycerol plasticized, amylose films prepared by the method of this invention have less of a tendency to lose their extensibility on aging than the amylose film of Example I. The above data also shows that the elastic modulus and tensile strength of amylose films prepared by the method of this invention are relatively stable and do not change as the amylose film ages.

An amylose film prepared by the method of this example and stored at 23° C. and 20% humidity for one week had 16% elongation.

*Example III*

This example illustrates the embrittling effect of polyglycerol, which is sold by Witco Chemical under the trade name EMCOL P. G., on amylose films prepared in the described prior art manner. An aqueous solution of defatted corn amylose was prepared by pumping an aqueous slurry of 12 parts by weight corn amylose and 3 parts by weight polyglycerol in 88 parts by weight water through a 35 foot long, .120" I.D. coil of tubing heated to 140° C. and having a dwell time of 2 minutes. The aqueous solution was cooled to 95° C. and placed in a preheated Dewar flask (95° C.). The solution was cast on a lecithin-coated plate at 96° C. using a doctor blade preheated to 90° C. The plate was maintained at 96° C. for an additional seven minutes and then the film was stripped from the glass plate and stored at 23° C. and 50% relative humidity for one week. The film was so brittle that no physical measurements could be run.

An amylose film prepared in the same manner without any polyglycerol plasticizer had a tensile strength of 6670 p.s.i., an elastic modulus of 500,000 p.s.i., and 2% elongation after storage for one week at 23° C. and 50% relative humidity.

No improvement in the properties of polyglycerol plasticized amylose films resulted from solubilizing the amylose at either 150° C. for two minutes or 155° C. for two minutes. The above data clearly shows the embrittling effect of polyglycerol on films prepared by the method of U.S. Patent 2,822,581.

*Example IV*

This example illustrates that polyglycerol is an excellent plasticizer for amylose films prepared by the method of this invention at 50% relative humidity. Example II was repeated except that the 3 parts by weight of glycerol were replaced by 3 parts by weight polyglycerol and the amylose gels were dried for 5 minutes at 96° C. The percent elongation, tensile strength and elastic modulus of the polyglycerol plasticized amylose films were determined after 1, 4, 8, and 16 weeks at 23° C. and 50% relative humidity. The results are set forth below in Table III.

TABLE III

| Age of Film in Weeks | Film Thickness in Mils | Elastic Modulus in p.s.i. | Tensile Strength in p.s.i. | Percent Elongation |
|---|---|---|---|---|
| 1 | 1.29 | 335,000 | 5,650 | 16 |
| 4 | 1.52 | 315,000 | 5,300 | 33 |
| 8 | 1.71 | 244,000 | 5,040 | 22 |
| 16 | 1.56 | 213,000 | 4,160 | 22 |

The above data illustrates that polyglycerol is an effective amylose plasticizer for amylose films prepared by the method of this invention at 50% relative humidity. On the other hand, Example III illustrates that polyglycerol is worse than no plasticizer under some conditions of amylose film formation.

*Example V*

This example illustrates that diglycerol, sorbitol and 1,2,6-hexanetriol are excellent plasticizers for amylose films prepared by the method of this invention. Example II was repeated except that the 3 parts by weight glycerol used in Example II was replaced by 3 parts by weight of diglycerol, sorbitol and 1,2,6-hexanetriol and the amylose gels were dried at 96° C. for 7 minutes. The results of storing the amylose films at 23° C. and 50% relative humidity are set forth in Table IV.

TABLE IV

| Plasticizer | Age of Film in Weeks | Film Thickness in Mils | Elastic Modulus in p.s.i. | Tensile Strength in p.s.i. | Percent Elongation |
|---|---|---|---|---|---|
| Diglycerol | 1 | 1.91 | 232,000 | 4,470 | 38 |
| Do | 2 | 1.84 | 213,000 | 4,300 | 60 |
| Do | 4 | 1.72 | 236,000 | 4,370 | 37 |
| Do | 16 | 1.89 | 157,000 | 4,190 | 50 |
| Sorbitol | 1 | 1.63 | 361,000 | 6,260 | 15 |
| Do | 2 | 1.55 | 397,000 | 6,750 | 24 |
| Do | 4 | 1.85 | 286,000 | 5,810 | 22 |
| Do | 16 | 1.70 | 257,900 | 4,710 | 22 |
| 1,2,6-hexanetriol | 1 | 1.57 | 275,000 | 4,580 | 32 |
| Do | 2 | 1.57 | 227,000 | 4,710 | 19 |
| Do | 4 | 1.75 | 293,000 | 3,490 | 26 |
| Do | 8 | 1.87 | 202,000 | 3,750 | 53 |

The physical properties of the above films were also determined after storing the films at 23° C. and 20% relative humidity for one week. The results are set forth below in Table V.

TABLE V

| Plasticizer | Film Thickness | Elastic Modulus in p.s.i. | Tensile Strength in p.s.i. | Percent Elongation |
|---|---|---|---|---|
| Diglycerol | 1.79 | 447,000 | 10,400 | 20 |
| Sorbitol | 1.53 | 509,000 | 12,200 | 14 |
| 1,2,6-hexanetriol | 1.93 | 226,000 | 4,480 | 31 |

*Example VI*

An aqueous solution of defatted corn amylose was prepared by pumping an aqueous slurry of 7.8 parts by weight corn amylose (d.s.b.) and 0.9 part by weight corn amylopectin (d.s.b.) in 91.3 parts by weight of water through a 35 foot long, .120" I.D. coil of tubing heated to 155° C. and having a dwell time of 2 minutes. The aqueous solution was cooled to 95° C. and placed in a preheated Dewar flask (95° C.). The solution was cast on a lecithin coated plate at 40° C. using a doctor blade preheated to 95° C. As soon as the amylose gelled, the gel was dried at 96° C. for seven minutes. The films were stripped from the glass plate. After one week at 23° C. and 50% relative humidity, the sparkling clear 1 mil films had a tensile strength of 9,780 p.s.i., elastic modulus of 508,000 p.s.i. and 8% elongation. After two weeks at 23° C. and 50% relative humidity the films had a tensile strength of 9,630 p.s.i., elastic modulus of 519,000 p.s.i., and 9% elongation. After one week at 23° C. and 20% relative humidity, the films had a tensile strength of 14,400 p.s.i., elastic modulus of 535,000 p.s.i. and 8% elongation.

*Example VII*

An aqueous solution of defatted corn amylose was prepared by pumping an aqueous slurry of 5.3 parts by weight corn amylose (d.s.b.) and 0.6 part by weight corn amylopectin (d.s.b.) in 94.1 parts by weight water through a 35 foot long, .120" I.D. coil of tubing heated to 140° C. and having a dwell time of 2 minutes.

The aqueous solution was cooled to 95° C. and placed in a preheated Dewar flask (95° C.). The solution was cast on a lecithin coated plate at 50° C. using a doctor blade preheated to 95° C. As soon as the amylose gelled, the gel was dried at 96° C. for 10 minutes. The films, which were not quite as clear as the films of Example VI, were stripped from the glass plate and stored. After one week at 23° C. and 50% relative humidity, the 1 mil films had a tensile strength of 10,300 p.s.i., elastic modulus of 527,000 p.s.i. and 6% elongation. After two weeks at 23° C. and 50% relative humidity, the films had a tensile strength of 9,800 p.s.i., elastic modulus of 545,000 p.s.i. and 9% elongation. After one week at 23° C. and 20% relative humidity, the films had a tensile strength of 14,300 p.s.i., elastic modulus of 520,000 p.s.i. and 8% elongation.

*Example VIII*

Example VII was repeated except that the amylose was dissolved at 150° C. and cast on a 40° C. support. After one week at 23° C. and 50% relative humidity, the sparkling clear 1 mil films had a tensile strength of 9,780 p.s.i., elastic modulus of 533,000 p.s.i. and 8% elongation. After two weeks at 23° C. and 50% relative humidity, the films had a tensile strength of 9,750 p.s.i., elastic modulus of 560,000 p.s.i. and 8% elongation. After one week at 23° C. and 20% relative humidity, the films had a tensile strength of 13,900 p.s.i., elastic modulus of 533,000 p.s.i. and 7% elongation.

*Example IX*

Example VII was repeated except that the amylose solution was cast on a 60° C. support. After one week at 23° C. and 50% relative humidity, the 1 mil films had a tensile strength of 9,770 p.s.i., elastic modulus of 512,000 p.s.i. and 6% elongation. After two weeks at 23° C. and 50% relative humidity, the films had a tensile strength of 8,390 p.s.i., elastic modulus of 519,000 p.s.i. and 6% elongation. After one week at 23° C. and 20% relative humidity, the films had a tensile strength of 12,600 p.s.i., elastic modulus of 508,000 p.s.i. and 5% elongation.

*Example X*

This example illustrates orientation of an amylose gel as the gel dries. An aqueous solution of undefatted corn amylose was prepared by pumping an aqueous slurry of 7.2 parts by weight corn amylose (d.s.b.) and 0.8 part by weight corn amylopectin (d.s.b.) in 72 parts by weight water through a 35 foot long, .120" I.D. coil of tubing heated to 150° C. and having a dwell time of 3 minutes. The aqueous solution was cooled to 95° C. and then cast on a lecithin coated glass plate at 28° C. using a doctor blade preheated to 115° C. After two minutes, the amylose gel was placed across the mouth of a 5½" steel beaker. The beaker was placed in a 75° C. oven for 10 minutes and then equilibrated at 20% relative humidity and room temperature. The film had 11% elongation.

*Example XI*

An aqueous solution of undefatted corn amylose was prepared by pumping an aqueous slurry of 7.2 parts by weight corn amylose (d.s.b.) and 0.8 part by weight corn amylopectin (d.s.b.) in 72 parts by weight water through a 35 foot long, .120" I.D. coil of tubing heated to 150° C. and having a dwell time of 2.2 minutes. The aqueous solution was cooled to 95° C. and then cast on a lecithin coated glass plate at 28° C. using a doctor blade preheated to 115° C. After three minutes, the amylose gel was placed across the mouth of a 5½" steel beaker. The beaker was placed in a 115° C. oven for 10 minutes and then equilibrated at 20% relative humidity and room temperature. The film had 12% elongation.

Since many embodiments of this invention may be made and since many changes may be made in the embodiments described, the foregoing is to be interpreted as illustrative only and our invention is defined by the claims appended hereafter.

We claim:

1. The process of preparing dense, continuous amylose films which comprises dissolving amylose in water at a temperature of at least 130° C. without an organic amylose-complexing agent, casting a film of said amylose solution on a support having a temperature at least 10° C. less than the gelation temperature of the amylose solution to form a dimensionally stable gel, and drying said amylose gel under restraint at a temperature above the gelation temperature of the amylose solution to form a dense film.

2. The process of preparing dense, continuous amylose films which comprises dissolving amylose in water at a temperature of at least 130° C. without an organic amylose-complexing agent, said amylose and water being in a weight ratio of 1:24 to 1:4, casting a film of said amylose solution on a support having a temperature at least 10° C. less than the gelation temperature of the amylose solution to form a dimensionally stable gel, and drying said amylose gel under restraint at a temperature above the gelation temperature of the amylose solution to form a dense film.

3. The process of preparing dense, continuous amylose films which comprises dissolving amylose in water at a temperature of at least 130° C. without an organic amylose-complexing agent, said amylose and water being in a weight ratio of 7:93 to 7:43, casting a film of said amylose solution on a support having a temperature of from about 0° C. to 40° C. to form a dimensionally stable gel, and drying said amylose gel under restraint at a temperature above the gelation temperature of the amylose solution to form a dense film.

4. The process of claim 3, wherein said amylose comprises the separated fraction of whole starch.

5. The process of claim 4, wherein said amylose casting solution contains a plasticizing concentration of a polyhydric alcohol.

6. The process of claim 3, wherein said amylose gel is dried at about 75° C.–120° C. in an atmosphere in which a substantial relative humidity is maintained.

7. The process of claim 3, wherein said amylose gel is dried while partially supported by a gas.

8. The process of preparing dense, continuous amylose films which comprises dissolving amylose in water including essentially all the crystallite seed nuclei in said amylose in the absence of organic amylose-complexing agent, said amylose and water being in a weight ratio of 1:24 to 1:4, under conditions such that a 10 percent by weight aqueous solution of said amylose forms a discontinuous, noncohesive layer on a lecithin coated support maintained at about 96° C., casting a film of said amylose solution on a support having a temperature at least 10° C. less than the gelation temperature of the amylose solution to form a dimensionally stable gel, and drying said amylose gel under restraint at a temperature above the gelation temperature of the amylose solution to form a dense film.

9. The process of claim 8, wherein said amylose comprises the separated fraction of whole starch.

10. The process of claim 9, wherein said amylose comprises defatted corn amylose.

11. The process of claim 9, wherein said amylose casting solution contains a plasticizing concentration of a polyhydric alcohol.

12. The process of claim 9, wherein said amylose is dried while partially supported by a gas.

13. The process of preparing dense, continuous amylose films which comprises dissolving amylose in water, including essentially all the crystallite seed nuclei in said amylose in the absence of organic amylose-complexing agent, said amylose and water being in a weight ratio of 7:93 to 7:43, under conditions such that a 10 percent by weight aqueous solution of said amylose forms a discontinuous, noncohesive layer on a lecithin coated support maintained at about 96° C., casting a film of said aqueous solution of amylose onto a support having a temperature of from about 0° C. to 40° C. to form a dimensionally stable gel, and drying said amylose gel under restraint at a temperature above the gelation temperature of the amylose solution to form a dense film.

14. The process of claim 13, wherein said amylose comprises the separated fraction of whole starch.

15. The process of claim 13, wherein said amylose gel is dried at about 75° C. to 120° C. in an atmosphere in which a substantial relative humidity is maintained.

16. The process of claim 13, wherein said amylose casting solution contains a plasticizing concentration of a plasticizer selected from the group consisting of glycerol, sorbitol, and 1,2,6-hexanetriol.

17. The process of claim 13, wherein said amylose film is orientated during the drying step.

18. The process of preparing dense, continuous amylose films which comprises dissolving amylose in water, including essentially all the crystallite seed nuclei in said amylose in the absence of organic amylose-complexing agent, said amylose and water being in a weight ratio of 7:93 to 7:43, under conditions such that a 10 percent by weight aqueous solution of amylose forms a discontinuous, non-cohesive layer on a lecithin-coated support maintained at about 96° C., casting a film of said amylose solution on a support having a temperature at least 10° C. less than the gelation temperature of the amylose solution to form a dimensionally stable gel, and drying said amylose gel under restraint at a temperature above the gelation temperature of the amylose solution to form a dense film.

19. The process of preparing dense, continuous amylose films which comprises the steps of
  (1) forming a solution comprising amylose and water, wherein the amylose is dissolved in water in the absence of an organic amylose-complexing agent by heating, at a temperature of at least 130° C., an amylose composition consisting essentially of a composition selected from the group consisting of (A) amylose and water and (B) amylose, water and plasticizer;
  (2) casting a film from the amylose solution of step (1) on a support having a temperature at least 10° C. less than the gelation temperature of the amylose solution to form a dimensionally stable gel; and
  (3) drying said amylose gel under restraint at a temperature above the gelation temperature of the amylose film to form a dense film.

20. The process of claim 19, wherein the amylose composition consists essentially of amylose and water and the amylose solution applied in step (2) contains a plasticizer.

21. The process of preparing dense, continuous amylose films which comprises the steps of
  (1) forming a solution comprising amylose and water in a weight ratio of 1:24 to 1:4, wherein the amylose, including essentially all the seed nuclei in said amylose, is dissolved in the absence of organic amylose-complexing agent, by treating an amylose composition consisting essentially of a composition selected from the group consisting of (A) amylose and water and (B) amylose, water and plasticizer under conditions such that a 10 percent by weight aqueous solution of said amylose forms a discontinuous, non-cohesive layer on a lecithin coated support maintained at about 96° C.,
  (2) casting a film from the amylose solution of step (1) on a support having a temperature at least 10° C. less than the gelation temperature of the amylose solution to form a dimensionally stable gel, and
  (3) drying said amylose gel under restraint at a temperature above the gelation temperature of the amylose film to form a dense film.

References Cited
UNITED STATES PATENTS

| | | | |
|---|---|---|---|
| 2,034,716 | 3/1936 | Dreyfus | 264—218 |
| 2,608,723 | 9/1952 | Wolff | 264—217 |
| 2,656,571 | 10/1953 | Davis | 264—217 |
| 2,822,581 | 2/1958 | Muetgeert | 264—217 |
| 3,030,667 | 4/1962 | Kunz | 264—218 |
| 3,081,181 | 3/1963 | Rutenberg | 106—122 |

ROBERT F. WHITE, *Primary Examiner.*

R. B. MOFFITT, *Assistant Examiner.*